March 10, 1964 B. F. THOMAS 3,123,907
METHOD OF MAKING HONEYCOMB STRUCTURE
Filed Sept. 29, 1958
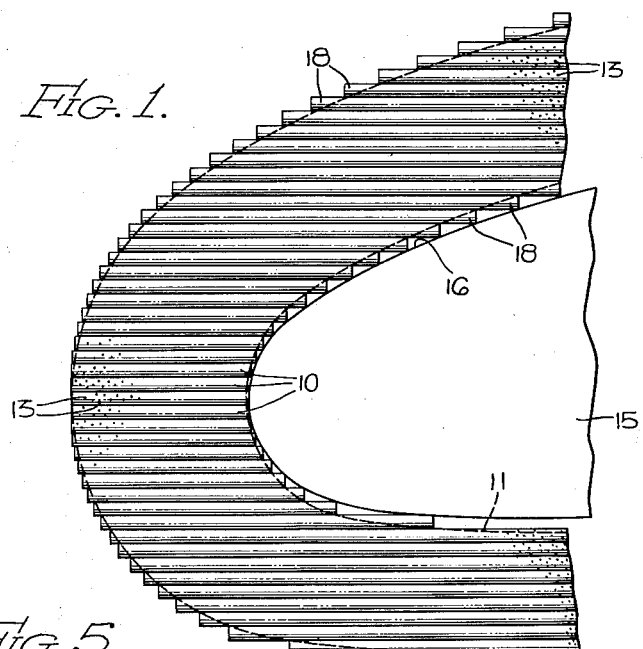
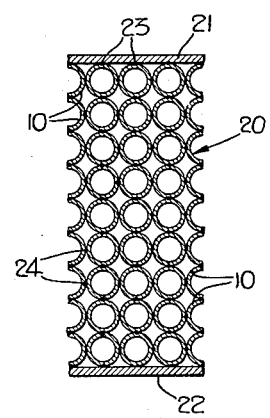
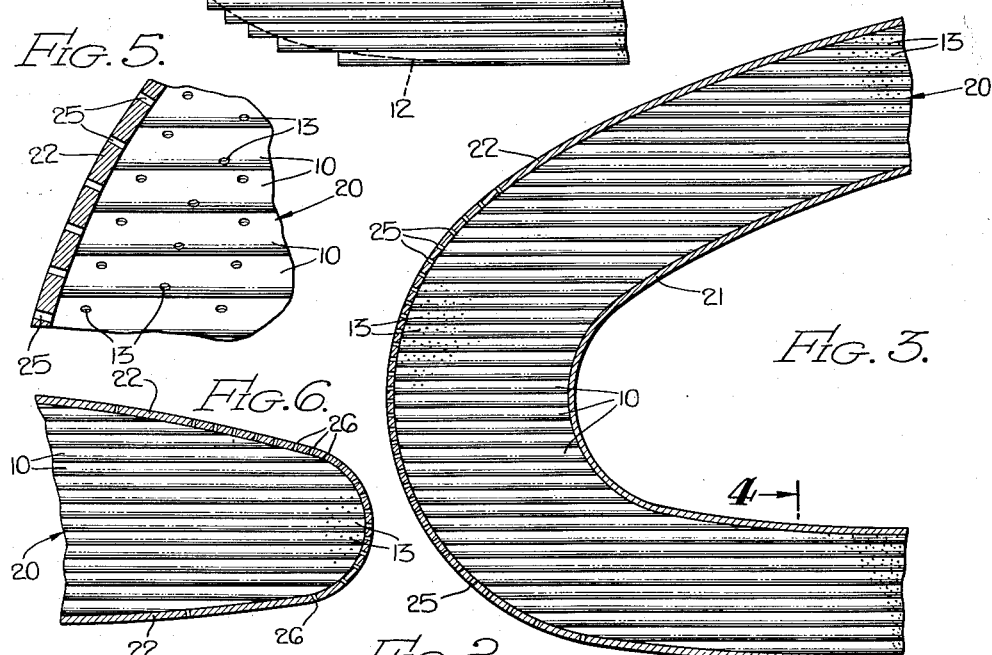
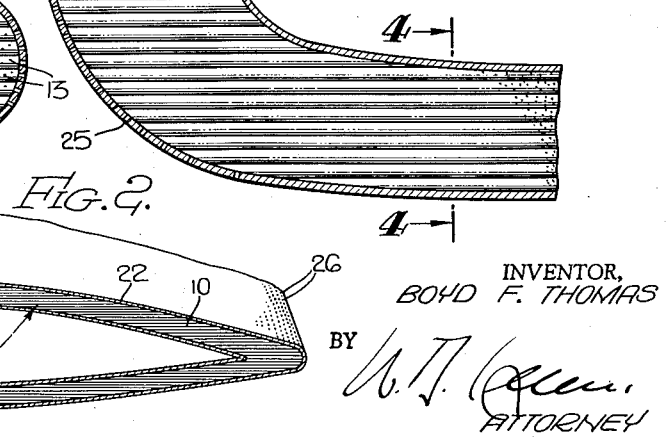
INVENTOR,
BOYD F. THOMAS
BY
ATTORNEY United States Patent Office 3,123,907
Patented Mar. 10, 1964

3,123,907
METHOD OF MAKING HONEYCOMB STRUCTURE
Boyd F. Thomas, Pasadena, Calif., assignor to Utility Metal Products Division of Young Spring and Wire Corporation, Pasadena, Calif., a corporation of Michigan
Filed Sept. 29, 1958, Ser. No. 764,054
5 Claims. (Cl. 29—455)

This invention relates to a method of making honeycomb sandwich structures featuring a cellular core, the opposite faces of which are curved.

Lightweight, high-strength sandwich structures making use of cellular cores have heretofore been proposed in a great variety of forms and quite satisfactory methods of making the same have been devised so long as the opposite surfaces of the core structure lie in flat planes. However, the provision of such structures with curved exterior surfaces has been accomplished only at inordinately high cost in time, materials and rejected assemblies. The problem has been particularly serious if the cell walls of the core structure are required to be very thin as is desirable for the development of maximum strength from a minimum weight of material.

For example, where it is desired that the cells be formed from stainless steel having a thickness of about one mil, it is the accepted current practice to form the core in cubes of approximately one foot on the side, the individual cells being hexagonal and bonded together along their contacting faces with the individual tubes arranged parallel to one another. Such a cube must be machined in a manner to carve out a core of the required contour prior to bonding between similarly curved metal face sheets. However, before machine carving is possible, it is necessary to fill the cell cavities with a fusible supporting material such as beeswax, such a filling serving to support the cell walls during machining. After machining has been completed, the fusible material is melted away after which the fragile core is subjected to cleansing operations to remove final traces of the fusible material, an operation carried out at great risk since a manufacturing investment of several thousands is now represented by the piece carved from the one square foot of material. Thereafter, the core is assembled between curved face sheets. It is also pointed out that the described carvings can only be made from small size cubes of the core material and that no satisfactory method has been devised for joining together the small carvings formed from these cubes.

By the present invention there is provided a simpler, more direct and far less costly mode of fabricating both the core structure and the final sandwich product, and which is not subject to the serious size limitations referred to above and characteristic of prior non-planar sandwich structures. This end is achieved by utilizing continuous tubes of the core material, preferably of circular cross-section for maximum strength per unit of weight, and cutting such tubes into different lengths just sufficient to form a particular cell of the finished core product. Tubes of these different lengths are classified according to length and assembled in layers to form a core by the aid of suitable supporting forms appropriately contoured to provide a finished core product of the shape desired. The fabricating forms are somewhat different in shape than the desired finished surface of the core for reasons which will be understood in the detailed disclosure portion of this specification. Prior to assembly, the individual tubes are coated on their exterior with bonding compound. After the tubes have been assembled with their opposite ends projecting echelon fashion beyond the desired final finished curved surface, the assembly is placed in an oven and heated until the bonding material fuses. After the assembly has cooled, the protruding corners of the tubes are cut back to the desired curved surface following which face sheets are bonded to the opposite ends of the core cells. Preferably the tubes in each layer of the core assembly are in direct alignment with one another, both vertically and horizontally, as distinguished from an assembly wherein one row of tubes nests in the crevices between the tubes of adjacent rows.

Another feature of importance particularly when the sandwich product provided thereby is employed as part of an aerodyanamically contoured surface, is the arrangement of the longitudinal axes of the core cells parallel to the path of travel of the contoured surface relative to the surrounding fluid medium. Each tube used in forming the core structure preferably has a multiplicity of small perforations roughly 25 mils in diameter through the walls thereof. These allow a cooling fluid to migrate through the core in considerable quantities. The cooling effect potential is considerably aided by the judicious provision of perforations in the surface plates of the sandwich structure to the end that a cooling medium may circulate through the core structure. For example, if the sandwich structure of this invention is employed as the surface covering of airfoil sections designed for high velocity operating conditions, leading edges of the outer surface plate are perforated allowing slipstream fluid to enter the core for circulation therethrough to outlet perforations in trailing surface areas of the sandwich structure. This arrangement provides highly superior heat exchange enabling the airfoil surface formed thereby to operate at a lower temperature than otherwise.

Accordingly, it is a primary object of the present invention to provide an improved method of making sandwich structure which is characterized by its greater strength-weight ratio, lower operating temperature characteristics, as well as one which can be fabricated more quickly and more economically than prior sandwich structures.

Another object of the invention is the provision of an improved method of fabricating cellular core structures for sandwich assemblies and utilizing thin-walled small diameter metal tubes of different lengths having their ends initially supported in echelon and thereafter bonded together before their protruding end corners are trimmed away along a curved surface for final assembly between curved face sheets.

Another object of the invention is the provision of an improved method for fabricating a lightweight, high-strength non-planar sandwich structure having tubular cells arranged parallel to one another and parallel to the intended path of the finished structure through a fluid medium.

These and other more specific objects will appear upon reading the following specification and claims and upon considering in connection therewith the attached drawing to which they relate.

Referring to the drawings in which a preferred embodiment of the invention is illustrated:

FIGURE 1 is a fragmentary cross-sectional view through a series of core tubes arranged in echelon to form a final core assembly having the curved contour indicated by the parallel curved dotted lines;

FIGURE 2 is a fragmentary perspective sectional view through an airfoil having an exterior skin formed by the sandwich structure according to this invention, the scale being appreciably smaller than FIGURES 1 and 3;

FIGURE 3 is a view similar to FIGURE 1 showing the tubes bonded together and with their protruding ends trimmed away and bonded to inner and outer face sheets;

FIGURE 4 is a fragmentary transverse view on an enlarged scale taken along line 4—4 on FIGURE 3;

FIGURE 5 is a fragmentary sectional view on a greatly enlarged scale through a portion of the leading edge of the structure illustrated in FIGURES 2 and 3; and FIGURE 6 is a transverse sectional view through the trailing edge of an airfoil covering formed of the disclosed sandwich structure.

Referring to FIGURE 1, there is shown a mulitiplicity of thin-walled tubes 10 preferably of circular cross-section formed from high-strength metal, as for example stainless steel. It will be understood that tubes 10 of one to three mils wall thickness are arranged in rows in side-by-side direct contact with one another, the tubes in each row usually being of the same length. This length is at least as great as the desired final thickness of the core between the face sheets to be attached to the opposite ends of the rows of tubes. Since the core assembly is normally formed with non-planar opposed surfaces the ends of tubes in adjacent rows are preferably arranged in echelon as is illustrated in FIGURE 1 to form a U-shaped core having a curved final surface contour generally indicated by dotted lines 11 and 12. It is important that all elements of each tube in all rows be at least as long as the distance between curved surfaces 11 and 12 measured in a direction parallel to the axes of the individual tubes. The portion of the tube ends in each row closest to finished surfaces 11 and 12 can terminate substantially even with these surfaces or slightly outwardly therebeyond, it being desirable that the exterior surface plates forming an essential part of the sandwich structure be in direct metal-to-metal contact with the entire cross-sectional end of each tube.

An important feature of tubes 10, which may be other than round, is the provision in each of a multiplicity of openings 13 of a size such as not to be closed by the bonding agent applied to join the tubes into an integral core unit in a manner to be described presently. Furthermore, the size of openings 13 is sufficiently small as not to weaken the tubes yet large enough in sum total as to pass a very considerable volume of a cooling medium. These various objectives are served admirably by openings approximately 25 mils in diameter.

The assembly of the tubes in the desired arrangement outlined above is facilitated by a suitable form or jig 15 having an appropriately contoured surface 16 differing somewhat from the adjacent curvature 11 desired in the completed core assembly. The reason for this difference will be apparent from FIGURE 1 and from the fact that, desirably, the various rows of tubes protrude a minimum distance consistent with the criteria that the entire end portion of each tube lies along curved surface 11 in the finish product. Accordingly, certain rows of the tube project further from surface 11 than do other rows with the result that surface 16 of form 15 does not lie parallel to surface 11.

Although a second form similar to form 15 is not shown opposite the outer ends of the tubes 10, it will be understood that such additional forms may be and preferably are used having curved surfaces shaped to conform generally to the juxtaposed surface 12, and co-operating with form 15 to hold the loose assembly of tubes in position prior to the bonding operation.

Although as herein shown the curved portions of surfaces 11 and 12 are confined to the plane on which FIGURE 1 is taken, it will be understood that these surfaces may curve in planes perpendicularly to the plane of FIGURE 1. Usually, however, the curvature of surfaces 11 and 12 is confined to a single plane.

It is found that highly superior heat exchange takes place if the axes of the individual tubes 10 lie parallel to the path of the relative motion of the sandwich structure in its final assembled position in the article of use. For example, if the sandwich structure is to be employed as a surface covering of an airfoil of an aircraft or some surface of a high velocity missile, it is desirable that the axes of the tubes used in a sandwich structure covering the leading edge of the airfoil lie parallel to the path of travel of this airfoil section. When so arranged, the sandwich structure not only has maximum strength, but operates at a markedly lower temperature than in any other disposition of the tubular cells. The reason for this is not understood but the superior results obtained with the described cell disposition can be readily demonstrated.

Prior to assembly, the individual tubes are preferably coated externally with a suitable brazing or bonding agent. Normally, all tubes in a given layer will be of the same length, but those in adjacent layers will be of slightly different lengths as necessary to comply with the criteria explained in detail above. Once the tubes are fully assembled and held in fixed relation by the assembly forms or other temporary holding means, they are clamped securely in place under slight pressure and placed in an oven and subjected to fusing temperature for the bonding agent employed. The tubes are held resiliently in this position while the fused bonding agent takes a set. Thereafter, the supporting forms are removed and the protruding ends of the layers of tube 10 are subjected to a finishing operation in which the triangular projections 18 of the various rows of tubes are removed. Since a relatively small amount of metal need be removed to provide the curved finished surfaces 11 and 12, various expedients may be employed for this finishing operation. For example, the triangular portions 18 of the tube ends may be removed in a grinding operation employing relatively slow cutting abrasive wheels applied under insufficient pressure to upset or deflect the thin walls of the tubes. Suitable stop or guide means will be employed in known manner to avoid cutting away metal beyond the desired finished surfaces 11 and 12.

Thereafter, the unitary core unit designated generally 20 is bonded or brazed to internal and external smooth-surfaced metal plates 21, 22 to provide a sandwich structure having its interior and exterior surfaces conforming to the curvatures represented by dotted lines 11 and 12, respectively. In the finished structure all portions of the tube ends or sides in direct contact with the interior surfaces of surface plates 21, 22 will be intimately bonded to these surface sheets as is indicated at 23 in FIGURE 4. Furthermore, each of the rows of tubes will be bonded to the rows of tubes to either side thereof as is indicated at 24.

In applications of the described sandwich structure to form airfoil surfaces operating at high velocities, as in missiles and aircraft, cooling of the sandwich is most desirable if not essential. This need is fulfilled in a most satisfactory manner by providing the leading and trailing edges of the surface plates with a myriad of minute openings through which the external fluid may bleed. Such openings are illustrated at 25, 26 in FIGURES 2 and 4, it being understood that inlet openings 25 are in the leading edge of the airfoil and outlet openings 26 are in the trailing edge. Although the present drawing shows cooling fluid openings only in the outer surface plate 22 of the sandwich, they may also be present in the inner surface plate 21 and placed in communication with fluid ducts leading to any desired point within the airfoil or other connected structure.

In use, the external air pressure immediately forward of the leading edge of the airfoil is at a maximum relative to the pressure acting on all other areas of the airfoil. Owing to the presence of the multiplicity of openings 25 in this high pressure area, portions of this air seeps into tubes 10 of the core from which it is distributed through openings 13 from tube to tube throughout the core structure of sandwich 20, the heated air discharging back to the atmosphere through outlet openings 26. By the continuing circulation of very substantial volumes of cold external air through the airfoil covering in the manner just described, the entire airfoil is maintained relatively cool and insulated against the frictional heat constantly generated by the passage of the airfoil through the atmosphere. It will be recognized that the circulation of the cooling fluid is due in part to the sub-atmospheric pressure normally prevailing opposite openings 26.

While the particular improved sandwich structure and method of making the same herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. That method of fabricating a core structure having a curvature face for a high strength laminated cellular material having non-planar exterior surfaces, said method comprising arranging thin-walled small diameter metal tubes in contacting side-by-side relation, off-setting the ends of adjacent tubes with a portion of one end edge of each lying in a desired curved face desired in the finished core and the remainder of the end portion of each projecting outwardly beyond said curved face, applying a bonding agent to the exterior of said tubes, holding the tubes firmly pressed together while subjecting the same to a temperature adequate to fuse the bonding agent, cooling said tubes until the fused bonding agent takes a set, removing that portion of the ends of said tubes at one end thereof projecting beyond said desired curved surface to provide a core structure having a curvate face crosswise of said one end of said tubes, and bonding a face sheet of thin flexible material to said curvate face of said tube ends.

2. That method defined in claim 1 characterized in that said tubes coated with bonding agent are arranged in parallel rows with the axes of any given four adjacent tubes being located at the corners of a square, all of said tubes being firmly held in this position while being rigidly bonded together by said bonding agent.

3. That method defined in claim 1 including the step of removing the projecting portions of the tubes at both ends thereof along a curvate path traversing the opposite ends of said tubes.

4. That method of making a lightweight high-strength laminated structure having a smooth non-planar aerodynamically contoured exterior surface, said method comprising arranging a multiplicity of thin-walled metal core tubes in close side-by-side contact with the end portions of adjacent tubes in adjacent rows terminating in different planes spaced from one another by varying distances depending on the shape of the finished curved surface desired in the finished structure and such that one end portion of each tube lies substantially in a finished curved surface and such that the remaining end portion of each tube projects beyond said desired finished curved surface, rigidly bonding the contacting surfaces of adjacent tubes together while said tubes are subjected to a temperature necessary to fuse a bonding agent applied to the exterior of said tubes and while the tubes are held firmly pressed together, removing said end portions projecting beyond said desired finished curved surface at the outer ends of said tubes, and bonding a smooth-surfaced flexible high-strength face sheet to the curved surface so provided at the curvate-finished ends of said core tubes to form a laminated structure having a desired exterior curvature supported on the interior side thereof by a core of elongated tubes having their axes parallel to one another and with the axes of a majority of said tubes lying at various angles other than a right angle to the surface of said face sheet.

5. That method of fabricating an aerodynamically contoured structure having a lightweight high-strength skin of laminated cellular material which method comprises, arranging a multiplicitiy of thin-walled metal tubes in side-by-side contact with the ends of tubes in adjacent rows terminating in echelon relationship by varying axial distances depending on the shape of the finished curved surface desired in the finished structure and such that one end portion of each tube lies substantially in said desired finished curved surface and the remaining end portion of each tube projects outwardly beyond said desired finished curved surface, the longitudinal axes of said tubes being parallel to one another and generally parallel to the path of movement to be taken by the structure when in use, rigidly bonding the contacting surfaces of adjacent tubes together while said tubes are subjected to a temperature required to fuse a bonding agent applied to the exterior of said tubes and while the tubes are firmly pressed together, removing the said remaining end portions of said tube projecting beyond said desired finished curved surface contour at the opposite ends thereof, and bonding smooth-surfaced high-strength flexible face sheets to the opposite ends of said tubes to form a laminated aerodynamically contoured structure.

References Cited in the file of this patent

UNITED STATES PATENTS

| 2,063,005 | Payne | Dec. 1, 1936 |
| 2,503,450 | Nebesar | Apr. 11, 1950 |
| 2,540,482 | Hervey | Feb. 6, 1951 |
| 2,693,922 | Ellison et al. | Nov. 9, 1954 |
| 2,746,139 | Van Pappelendam | May 22, 1956 |
| 2,756,496 | Holland | July 31, 1956 |
| 2,926,490 | Eaton et al. | Mar. 1, 1960 |
| 2,956,651 | Allred et al. | Oct. 18, 1960 |
| 2,988,809 | Hall | June 20, 1961 |

FOREIGN PATENTS

| 609,313 | Great Britain | Sept. 29, 1948 |